United States Patent [19]
Czwakiel

[11] 3,769,475
[45] Oct. 30, 1973

[54] PNEUMATIC BREAK DETECTOR SENSOR

[75] Inventor: Bert John Czwakiel, Schenectady, N.Y.

[73] Assignee: General Electric Company, New York, N.Y.

[22] Filed: Oct. 21, 1971

[21] Appl. No.: 191,306

[52] U.S. Cl. ............... 200/81.9, 73/37.7, 200/61.13
[51] Int. Cl. ...................... B65h 25/14, G01b 13/00
[58] Field of Search ...................... 73/40.5 R, 37.5, 73/37, 37.7, 37.6; 116/70; 200/61.13, 61.18, 81.19

[56] References Cited
UNITED STATES PATENTS

| | | | |
|---|---|---|---|
| 3,283,564 | 11/1966 | Biddison, Jr. | 73/37.7 |
| 3,199,339 | 8/1965 | Lipski | 73/37.7 |
| 3,188,856 | 6/1965 | Schneider | 73/37.7 |
| 3,576,411 | 4/1971 | Baroin | 200/61.13 X |
| 3,254,528 | 6/1966 | Michael | 73/40.5 R |
| 3,635,413 | 1/1972 | Gish | 200/61.18 X |
| 3,683,677 | 8/1972 | Harris | 73/49.2 |

*Primary Examiner*—S. Clement Swisher
*Assistant Examiner*—Daniel M. Yasich
*Attorney*—Frank L. Neuhauser et al.

[57] ABSTRACT

A pneumatic break detector sensor for detecting a break in a stranded material during its manufacturing process including a sensor head having a V-grooved slot through which the strand passes and to the center of which pressurized air is supplied, the pressurized air exiting through a sensing hole provided in the center of the V-grooved slot, and the back pressure level of the supplied air being sensed to provide an indication of a break in the strand of material.

6 Claims, 5 Drawing Figures

PATENTED OCT 30 1973                                                3,769,475

AIR SUPPLY

INVENTOR
BERT J. CZWAKIEL

BY    Arthur E. Fournier Jr.

ATTORNEY

PNEUMATIC BREAK DETECTOR SENSOR

BACKGROUND OF THE INVENTION

1. Field of the Invention

My invention relates to sensors of the type applicable for use in the sensing of continuous lengths of material, and more particularly to an improvement in pneumatic sensors of the type employed preferably in manufacturing operations to detect breaks in continuous lengths of stranded material.

2. Description of the Prior Art

In accordance with the prior art, it has been previously known to employ during manufacturing operations, break detector sensors to detect breaks in continuous lengths of strand-like material such as yarns, cables, wires, etc. Most commonly, electrical type sensors have been utilized for this purpose. However, a potentially limiting factor insofar as concerns the extensive usage of such electrical type sensors is the fact that such sensors are relatively expensive. In addition, such electrical type sensors suffer from the further disadvantage that they are subject to dirt buildup and possible malfunction as a result thereof. Furthermore, such electrical type sensors have proven to be susceptible to environmental influences such as humidity.

There have also been available in the past mechanical type snesors which have been utilized as break detector sensors. However, as in the case of electrical type sensors, these prior art forms of mechanical type sensors have likewise inherently suffered from certain disadvantages. For example, one such disadvantage stems from the fact that such mechanical type sensors include moving parts which are susceptible to a high rate of wear. In addition, particularly when used to sense breaks in continuous lengths of yarn, accumulations of lint have been found to build up in such mechanical type sensors. Such accumulations of lint or other forms of environmental dirt when they occur in a mechanical type sensor are of course undesirable inasmuch as they are capable of causing the sensor to malfunction or even possibly result in the complete disablement of the sensor.

OBJECTS OF THE INVENTION

It is therefore an object of the invention to provide a novel and improved pneumatic break detector sensor preferably for use in detecting breaks in continuous lengths of strand-like material which sensor substantially eliminates the susceptibility thereof to occurrences therein of accumulations of lint or other forms of environmental dirt which if present could have a deleterious effect on the operation of the sensor.

It is another object of the present invention to provide such a pneumatic break detector sensor for use in detecting breaks in continuous lengths of strand-like material which sensor has no moving parts and thus is not susceptible to a high rate of wear.

A further object of the present invention is to provide such a pneumatic break detector sensor for use in detecting breaks in continuous lengths of strand-like material which sensor is not susceptible to environmental influences such as humidity.

A still further object of the present invention is to provide such a pneumatic break detector sensor for use in detecting breaks in continuous lengths of strand-like material which sensor is relatively easy to manufacture and assemble while yet providing long life and reliability in operation.

Yet another object of the present invention is to provide such a pneumatic break detector sensor for use in detecting breaks in continuous lengths of strand-like material which sensor is susceptible to being installed in large numbers in view of its very low cost.

Yet a further object of the present invention is to provide such a pneumatic break detector sensor for use in detecting breaks in continuous lengths of strand-like material which sensor is characterized by the ease with which the strand-like material may be loaded into the sensor.

SUMMARY OF THE INVENTION

In accordance with a preferred form of the invention there is provided a pneumatic break detector sensor for use in detecting breaks in continuous lengths of strand-like material. The pneumatic break detector sensor includes a sensor head having a v-shaped grooved slot provided in one face thereof. The latter slot is provided with a hole extending from the root of the V-shaped grooved slot to the rear of the sensor head where it communicates with a manifold which preferably constitutes a portion of a mounting bracket provided for the purpose of enabling the sensor head to be suitably mounted in a given installation. When the sensor head is in use, the strand-like material lays at the root of the V-shaped grooved slot and passes across the aforementioned hole. Part of the pressurized air which is supplied from a suitable source to the manifold and therefrom to the sensor head is constantly discharged through the hole in the V-shaped grooved slot. When no strand-like material is passing across the hole, the flow of air from the hole is unimpeded and accordingly the back pressure level of the supplied air is low. When strand-like material is passing across the hole, the flow of air from the hole is impeded and the back pressure level is high. These back pressure levels of the supplied air are used as a detecting means to send a signal to an indicating means which in turn provides an indication of a break in the strand-like material being sensed.

The invention will be more fully understood from the following detailed description and its scope will be pointed out in the appended claims.

DESCRIPTION OF A PREFERRED EMBODIMENT

Figure 1:
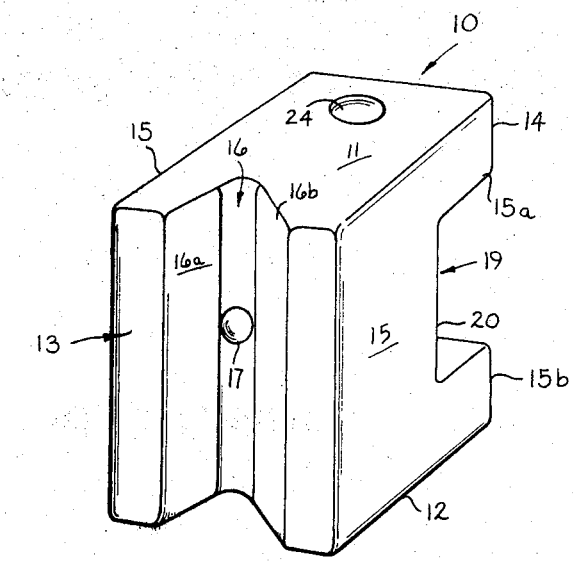
FIG. 1 is a perspective view of the sensor head of the pneumatic break detector sensor in accordance with the present invention.
Figure 2:
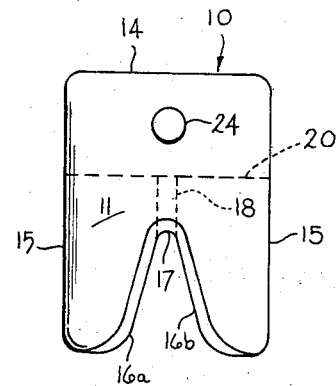
FIG. 2 is a top view of a slightly modified form of the sensor head of FIG. 1 in accordance with the present invention.
Figure 3:
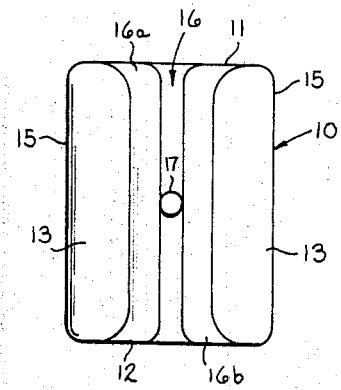
FIG. 3 is a front view of the sensor head of FIG. 2 in accordance with the present invention.

As illustrated in FIGS. 1, 2 and 3 of the drawing, the pneumatic break detector sensor in accordance with a preferred embodiment of the present invention includes a sensor head generally designated by reference numeral 10. The sensor head 10 as depicted in the drawing is generally rectangular in configuration. However, it is to be understood that modifications may be made in the external configuration of the sensor head 10 without departing from the essence of the invention as long as the basic mode of operation thereof as will be described more fully hereinafter is retained. Although in one form the sensor head 10 has been constructed of aluminum, it is preferable that the sensor head 10 be manufactured of a suitable form of ceramic material such as AlSiMag having the capability of providing the sensor head 10 with superior wear characteristics.

The sensor head 10 includes top and bottom walls 11 and 12, respectively, front and rear walls 13 and 14, respectively, and a pair of side walls 15. Front wall 13 has formed therein a V-shaped grooved slot 16 which functions in a manner to be set forth more fully subsequently. The side walls 16a and 16b of slot 16 diverge outwardly in a manner such that an angle of approximately 30° is formed therebetween. In contrast to the illustration thereof in FIG. 1 of the drawing, the outermost edges of slot side walls 16a and 16b are shown in FIGS. 2 and 3 as being substantially rounded. There is no specific requirement that these outermost edges be rounded to the extent shown in FIG. 1 or to the extent illustrated in FIGS. 2 and 3. Rather, the important consideration in this connection is that these outermost edges of slot side walls 16a and 16b be sufficiently smooth so as not to damage a strand-like material 110 (shown in FIG. 4) as the latter is fed into and through the slot 16.

Referring further to FIGS. 1, 2 and 3 of the drawing, the V-shaped grooved slot 16 has a hole 17 provided therein. The hole 17 is located at the root of the V of slot 16 and approximately midway along the length of slot 16. Hole 17 communicates with a passage 18 which extends entirely through the body of sensor head 10 from front to rear thereof.

As seen best with reference to FIG. 1, a portion of rear wall 14 has been removed to provide a large cut-out recessed portion or notch 19 therein. The latter notch 19 extends the entire width of rear wall 14 whereby a pair of leg portions 15a and 15b are created in each of the pair of side walls 15. The aforedescribed passage 18 as depicted in FIG. 2 of the drawing terminates at the inner surface 20 of notch 19.

Figure 4:
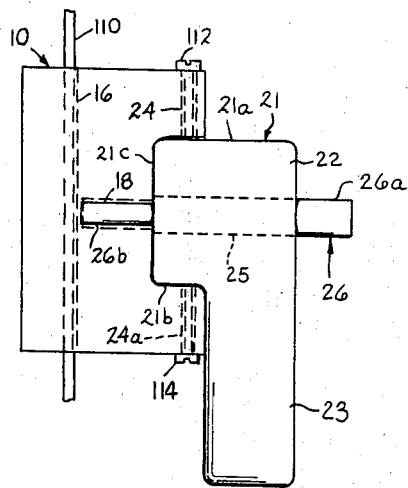
FIG. 4 is a side view of a manifold and mounting bracket in combination with the sensor head of FIG. 1 in accordance with the present invention.

Referring now to FIG. 4 of the drawing, there is illustrated therein a substantially L-shaped member 21 comprising a manifold 22 and a mounting bracket 23. Although as shown in FIG. 4, the manifold 22 and mounting bracket 23 are formed as an integral unit it is to be understood that the manifold 22 and mounting bracket 23 may also without departing from the essence of the invention be in the form of separate members. L-shaped member 21 is dimensioned such that the distance between top wall 21a thereof and the indented portion 21b thereof corresponds to the height dimension of notch 19 as viewed with reference to FIG. 1 of the drawing. Thus, as will be referred to further hereinafter, in the assembled condition the topmost portion, i.e., manifold 22 of L-shaped member 21 fits into the cut-out portion, i.e., notch 19 in the sensor head 10 with front wall 21c of L-shaped member in juxtaposed relation to the inner surface of notch 19.

Sensor head 10 and L-shaped member 21 are held in the aforedescribed assembled condition by suitable fastening means. In accordance with the preferred embodiment of the invention an opening 24 is suitably provided in top wall 11 of sensor head 10. Opening 24 extends completely through top wall 11 to notch 19. In addition a similar opening 24a (shown in FIG. 4) is preferably provided in bottom wall 12 extending from the outermost surface thereof to the notch 19. Each of the aforesaid openings is capable of receiving a suitable fastener such as respective bolts 112 and 114 which can be threaded into respective holes 24 and 24a. The latter fasteners are received in the openings such that they project therethrough and such that when the L-shaped member 21 and sensor head 10 are in the assembled condition the fasteners are received in suitable openings (not shown) provided for this purpose in top wall 21a and indented portion 21b, respectively, of L-shaped member 21. Although a pair of fasteners are preferably employed to secure the L-shaped member 21 and the sensor head 10 together, it is to be understood that more or fewer fasteners, or other forms of fastening means capable of securing sensor head 10 to L-shaped member 21 may also be employed without departing from the essence of the invention.

Referring further to FIG. 4 of the drawing, manifold 22 of L-shaped member 21 is provided with a through passage 25. The latter passage 25 is suitably positioned in manifold 22 such that when sensor head 10 and L-shaped member 21 are in the assembled condition passages 25 and 18 are in alignment. For purposes of fluidically interconnecting passage 25 and passage 18, a tubular member 26 is preferably employed.

Tubular member 26 comprises a cylindrical member having one end 26a thereof substantially equal in diameter to the diameter of passage 25 and the other end 26b thereof of reduced diameter corresponding to the diameter of passage 18. With reference to FIG. 4 it is thus seen that tubular member 26 is inserted into passage 25 such that the end 26a thereof projects outwardly from the rear of passage 25 as viewed with reference to FIG. 4 and the end 26b thereof projects outwardly from the front of passage 25. Moreover it can be seen that the interconnection of passage 25 and passage 18 can be accomplished by inserting the outwardly projecting end 26b of tubular member 26 into passage 18 with the rest of tubular member 26 remaining as depicted in FIG. 4. Tubular member 26 is suitably dimensioned such as to be capable of being received in the aforedescribed manner in passages 25 and 18 while still permitting front wall 21c of L-shaped member 21 to be brought in the assembled condition into juxtaposed relation with inner surface 20 of notch 19. Although as described hereinabove tubular member 26 comprises an integral member, it is to be understood that tubular member 26 could also take the form of two separate members of differing diameters without departing from the essence of the invention. If tubular member 26 were to take the form of two separate members, it might be found desirable to form the passage 25 such that the opposite ends thereof are of corresponding differing diameters.

Figure 5:
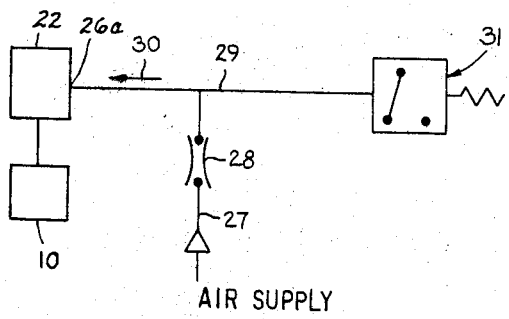
FIG. 5 is a schematic diagram of a portion of the circuitry for providing an indication of the detection of a break in the strand-like material being sensed by the pneumatic break detector sensor in accordance with the present invention.

Referring now to FIG. 5 of the drawing, a portion of the pneumatic circuitry with which the pneumatic break detector sensor in accordance with the present invention functions is illustrated schematically therein. Proceeding with a description thereof, pressurized air flows from a suitable air supply through line 27 to a fixed pneumatic resistor 28. From resistor 28, the flow of pressurized air is through line 29 in the direction of arrow 30 through manifold 22 to sensor head 10. Line 29 which for purposes of clarity of illustration has not been so depicted is in actual practice suitably connected to outwardly projecting end 26a of tubular member 26. The flow of pressurized air thus passes through tubular member 26 to passage 18 in sensor head 10 and exits from hole 17 in the V-shaped grooved slot 16. As illustrated in FIG. 5, a pressure switch 31 is connected to the other end of line 29. Pressure switch 31 functions in a manner to be more fully described hereinafter.

Turning now to a description of the mode of operation of the pneumatic break detector sensor in accordance with the present invention, the sensor head 10 and L-shaped member 21 are assembled in the manner previously described hereinabove. This assembly is thereafter mounted by suitable fastening means (not shown) passing through openings (not shown) in mounting bracket 23 in a given location such that the strand-like material to be monitored lays in V-shaped grooved slot 16. Also, line 29 is connected to outwardly projecting end 26a of tubular member 26 whereby pressurized air flows from the air supply through line 27, fixed pneumatic resistor 28, line 29, tubular member 26, and passage 18 such that at least a portion thereof exits constantly to the atmosphere from hole 17. As the pressurized air from the air supply which is at constant pressure flows through resistor 28 the latter in accordance with the preferred embodiment of the invention functions to drop the supply pressure to a suitable value to operate the pressure switch 31 within its range. When no strand-like material is passing through V-shaped grooved slot 16 in juxtaposed relation to hole 17, the back pressure level at the pressure switch 31 is low. However when strand-like material is present in the V-shaped grooved slot 16, the material impedes the flow of pressurized air from hole 17 and thus the back pressure level of the air at the pressure switch 31 is much higher and causes the pressure switch 31 which is so designed to actuate. The absence of strand-like material results in deactuation of switch 31 which in turn can indicate a break or discontinuity in the material being sensed. Thus, it is seen that the pneumatic break detector sensor in accordance with the present invention is capable of detecting a break in a continuous length of strand-like material be the latter material yarn, cable, wire, etc. and signals the pressure switch 31 by way of an increase in the back pressure level of the pressurized air in line 29 whereupon the pressure switch 31 is actuated thus producing an output therefrom which may be utilized in any suitable manner. That is, the output from pressure switch 31 may serve as an input to a signal circuit to cause an alarm to function, or to a control circuit to initiate action to stop the production machinery, etc.

Yarns from 70 to 4000 denier have been run through the pneumatic break detector sensor in accordance with the present invention having a sensor head constructed of aluminum and operating in the pneumatic circuit illustrated in FIG. 5 at speeds from 0–3000 ft/min. The subject pneumatic break detector sensor proved to be fully capable of detecting breaks in continuous lengths of yarn of the aforementioned denier within the aforesaid speed range. In addition the pneumatic break detector sensor in accordance with the present invention did not give any false-trip indication when yarn ends which were tied together with large knots passed by hole 17. The pneumatic flow rate consumed by a single sensor head 10 at about 0.05 psig level is nominally about 80–90 cc/min.

Although in accordance with the present invention a single sensor head 10 has been illustrated associated with the manifold 22, it is also contemplated without departing from the essence of the invention that a plurality of up to approximately twenty individual sensor heads may be run off a common manifold with the detector circuit being triggered by a common pressure switch. Test results have shown that up to approximately twenty sensor heads 10 could probable be monitored by one pressure switch 31. The recent availability of low powered pressure switches has now made it feasible not only to utilize a pressure switch as the indicator means for a single pneumatic break detector sensor but also makes possible the fact that one pressure switch is capable of functioning as indicator means for a plurality of sensor heads.

Thus, in accordance with the present invention there has been provided a novel and improved pneumatic break detector sensor preferably for use in detecting breaks in continuous lengths of strand-like material which sensor substantially eliminates the susceptiblity thereof to occurrences therein of accumulations of lint or other forms of environmental dirt which if present could have a deleterious effect on the operation of the sensor. This is accomplished essentially by virtue of the fact that during operation a continuous stream of pressurized air is exiting from hole 17 to the atmosphere. This stream of air as it passes to the atmosphere functions to disperse any accumulations of lint or other forms of environmental dirt which otherwise might exist. Further in accordance with the present invention a pneumatic break detector sensor has been provided which has no moving parts and thus is not susceptible to a high rate of wear. In addition the pneumatic break detector sensor of the present invention is not susceptible to environmental influences such as humidity. Also it is to be noted that the pneumatic break detector sensor in accordance with the present invention is relatively easy to manufacture and assemble while yet providing long life and reliability in operation. Finally the pneumatic break detector sensor of the instant invention by virtue of the fact that it is of very low cost lends itself to being employed in relatively large numbers.

While only one embodiment of my invention has been shown, it will be appreciated that modifications thereof may readily be made therein by those skilled in the art. Some of these modifications have been suggested in the preceding description. I therefore intend by the appended claims to cover all such modifications as well as all other modifications which fall within the true spirit and scope of my invention.

What I claim as new and desire to secure by Letters Patent of the United States is:

1. Apparatus for pneumatically detecting discontinuities in a continuous moving length of strand-like material comprising:
   a. a sensor head having a first side and a second side opposite said first side;
   b. said head having a slot between said first and second sides and extending inwardly from a front side for passing the continuous moving length of strand-like material therethrough, a recessed cut-out section, in a back side and extending inwardly therefrom, and a passage through said sensor head from said slot to said recessed cut-out section;
c. a manifold having a passage therethrough;
d. said cut-out section receiving at least a portion of said manifold therewithin;
e. means sealingly and fluidically interconnecting the passage in said manifold to the passage in said sensor head; and
f. means fluidically connected to said manifold for sensing the back pressure level of fluid supplied through the passages in said manifold and sensor head to said slot for indicating a change in the continuity of the strand-like material passing through said slot.

2. Apparatus according to claim 1 further including means for fastening said portion of said manifold to said sensor head.

3. Appartus according to claim 1 wherein said interconnecting means further includes a first tubular portion extending outward from one end of the passage in said manifold and into the passage in said sensor head.

4. Apparatus according to claim 3 wherein said interconnecting means further includes a second tubular portion integral with said first tublar portion passing through the passage in said manifold and extending outward from the other end thereof.

5. Apparatus according to claim 1 further including a mounting bracket integrally formed with said manifold.

6. Apparatus according to claim 1 further including a pressure switch actuatable in response to a predetermined fluid back pressure level.

* * * * *

PO-1050
(5/69)

UNITED STATES PATENT OFFICE
CERTIFICATE OF CORRECTION

Patent No. 3,769,475  Dated January 15, 1974

Inventor(s) Bert J. Czwakiel

It is certified that error appears in the above-identified patent and that said Letters Patent are hereby corrected as shown below:

Column 8, line 8,    "tublar" should be - tubular -

Signed and sealed this 9th day of April 1974.

(SEAL)
Attest:

EDWARD M. FLETCHER, JR.
Attesting Officer

C. MARSHALL DANN
Commissioner of Patents